United States Patent
Cho et al.

(10) Patent No.: US 12,044,864 B2
(45) Date of Patent: Jul. 23, 2024

(54) STEREOSCOPIC IMAGE DISPLAY DEVICE COMPRISING AN EYE DETECTION SENSOR THAT INCLUDES A CAMERA AND FIRST AND SECOND LATTICE MEMBERS

(71) Applicant: SAMSUNG DISPLAY CO., LTD., Yongin-si (KR)

(72) Inventors: Hyun Jin Cho, Yongin-si (KR); Jae Ho You, Yongin-si (KR); Jong Ho Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/155,693

(22) Filed: Jan. 17, 2023

(65) Prior Publication Data

US 2023/0229015 A1 Jul. 20, 2023

(30) Foreign Application Priority Data

Jan. 18, 2022 (KR) ........................ 10-2022-0007336

(51) Int. Cl.
| | |
|---|---|
| G02B 30/25 | (2020.01) |
| G02B 27/00 | (2006.01) |
| G02F 1/1335 | (2006.01) |
| G02F 1/1343 | (2006.01) |

(52) U.S. Cl.
CPC ......... *G02B 30/25* (2020.01); *G02B 27/0093* (2013.01); *G02F 1/133504* (2013.01); *G02F 1/134327* (2013.01)

(58) Field of Classification Search
CPC .... G02F 1/134327; G02B 30/40; G02B 30/26
See application file for complete search history.

(56) References Cited

U.S. PATENT DOCUMENTS

| | | | |
|---|---|---|---|
| 9,291,828 B2 | 3/2016 | Kroll et al. | |
| 9,514,692 B2 | 12/2016 | Wu | |
| 2016/0091763 A1* | 3/2016 | Koito | ................ G02F 1/133345 |
| | | | 349/33 |
| 2021/0341779 A1* | 11/2021 | Okita | ................ G02F 1/133536 |
| 2021/0343988 A1 | 11/2021 | Gao et al. | |

FOREIGN PATENT DOCUMENTS

| | | | | |
|---|---|---|---|---|
| CN | 101025476 A | * | 8/2007 | ........... H04N 13/305 |
| CN | 106292093 A | * | 1/2017 | |
| CN | 111384284 | | 7/2020 | |
| JP | 2020-118879 | | 8/2020 | |
| KR | 10-1112546 | | 1/2012 | |

* cited by examiner

*Primary Examiner* — Paul C Lee
(74) *Attorney, Agent, or Firm* — F. CHAU & ASSOCIATES, LLC

(57) ABSTRACT

A stereoscopic image display device includes an eye detection sensor that includes a camera that captures an image of a user's eyes, a display panel disposed on the eye detection sensor and that includes pixels, and a light modulator disposed on the display panel and that controls the path of light output from the display panel. The light modulator includes a first electrode layer, a second electrode layer that faces the first electrode layer and includes a first sub-electrode that overlaps a first area of the eye detection sensor and a second sub-electrode that does not overlap the first area but overlaps a second area of the eye detection sensor that overlaps the camera, and a liquid crystal layer disposed between the first electrode layer and the second electrode layer and that includes liquid crystal molecules.

10 Claims, 13 Drawing Sheets

Voxel(3D pixel)

<First Mode>

<Second Mode>

<Third Mode>

STEREOSCOPIC IMAGE DISPLAY DEVICE COMPRISING AN EYE DETECTION SENSOR THAT INCLUDES A CAMERA AND FIRST AND SECOND LATTICE MEMBERS

CROSS-REFERENCE TO RELATED APPLICATION

The present application claims priority under 35 U.S.C. § 119 from Korean patent application number 10-2022-0007336, filed on Jan. 18, 2022 in the Korean Intellectual Property Office, the contents of which are herein incorporated by reference in their entirety.

TECHNICAL FIELD

Various embodiments of the present disclosure are directed to a stereoscopic image display device, and more particularly, to a stereoscopic image display device that displays a three-dimensional (3D) image.

DISCUSSION OF THE RELATED ART

A stereoscopic image display device provides physical characteristics such that a viewer experiences the sensation of three dimensions by stimulating the visual sense of the viewer in the same way that actual objects do. For example, a stereoscopic image display device provides different images respectively to a viewer's left and right eyes, thereby enabling the viewer to view a stereoscopic image based on binocular parallax between the viewer's left and right eyes.

Autostereoscopic methods, which do not require the wearing of stereoscopic glasses, include a diffraction grating method, which separates a left-eye image and a right-eye image using a grating array, a lenticular method, which separates the left-eye image and the right-eye image using a cylindrical lens array, a barrier method, which separates the left-eye image and the right-eye image using a barrier, etc.

SUMMARY

Various embodiments of the present disclosure are directed to a stereoscopic image display device that increases the quality of images provided to users.

Furthermore, various embodiments of the present disclosure are directed to a stereoscopic image display device that has a reduced overall size and bezel size.

Embodiments of the present disclosure provide a stereoscopic image display device. The stereoscopic image display device includes an eye detection sensor that includes a camera that captures an image of a user's eyes, a display panel disposed on the eye detection sensor and that includes pixels, and a light modulator disposed on the display panel and that controls a path of light output from the display panel. The light modulator includes a first electrode layer, a second electrode layer that faces the first electrode layer and includes a first sub-electrode that overlaps a first area of the eye detection sensor and a second sub-electrode that does not overlap the first area but overlaps a second area of the eye detection sensor that overlaps the camera, and a liquid crystal layer disposed between the first electrode layer and the second electrode layer and that includes liquid crystal molecules.

In an embodiment, an alignment direction of liquid crystal molecules of the liquid crystal layer that overlap the first area is controlled by a voltage applied to the first sub-electrode, and an alignment direction of liquid crystal molecules of the liquid crystal layer that overlap the second area is controlled by a voltage applied to the second sub-electrode.

In an embodiment, the first electrode layer includes a base layer disposed on the display panel and a lower electrode disposed on the base layer.

In an embodiment, the second electrode layer includes a first sub-electrode layer that includes a first sub-base layer, where the first sub-electrode is disposed on the first sub-base layer, and a second sub-electrode layer that includes a second sub-base layer disposed on the first sub-electrode layer, where the second sub-electrode is disposed on the second sub-base layer.

In an embodiment, the second electrode layer includes a first sub-base layer. The first sub-electrode is disposed on the first sub-base layer, the second sub-electrode is disposed on the first sub-base layer, and the first sub-electrode and the second sub-electrode are disposed in a same layer.

In an embodiment, the first electrode layer includes a base layer disposed on the display panel, a third sub-electrode disposed to on the base layer, where the third sub-electrode overlaps the first area, and a fourth sub-electrode disposed on the base layer, where the fourth sub-electrode overlaps the second area. The third sub-electrode and the fourth sub-electrode are disposed in a same layer.

In an embodiment, the light modulator further includes a diffraction grating layer disposed on the liquid crystal layer and that diffracts light that is output from the display panel and has passed through the liquid crystal layer.

In an embodiment, the diffraction grating layer is disposed between the liquid crystal layer and the second electrode layer.

In an embodiment, the second electrode layer is disposed between the diffraction grating layer and the liquid crystal layer.

In an embodiment, the display panel further includes a substrate, where the pixels are disposed and spaced apart from each other on the substrate, and a first lattice member and a second lattice member, each disposed on the substrate and between the pixels. The first lattice member overlaps the first area, and the second lattice member overlaps the second area.

In an embodiment, the first lattice member includes a light-absorbing material, and the second lattice member includes a light-transmissive material.

In an embodiment, the light modulator furthers include a lens array disposed on the liquid crystal layer and that refracts light that is output from the display panel and that has passed through the liquid crystal layer.

Embodiments of the present disclosure provide a stereoscopic image display device. The stereoscopic image display device includes an eye detection sensor that includes a camera that captures an image of a user's eyes, a display panel disposed on the eye detection sensor and that includes pixels, and a light modulator disposed on the display panel and that controls a path of light output from the display panel. The display panel includes a substrate, where the pixels are disposed and spaced apart from each other on the substrate, and a first lattice member and a second lattice member, each disposed on the substrate and between the pixels. The first lattice member overlaps a first area of the eye detection sensor, and the second lattice member does not overlap the first area but overlaps a second area of the eye detection sensor that overlaps the camera.

In an embodiment, the first lattice member includes a light-absorbing material, and the second lattice member includes a light-transmissive material.

In an embodiment, the light modulator includes a first electrode layer, a second electrode layer that faces the first electrode layer, and a liquid crystal layer disposed between the first electrode layer and the second electrode layer and that includes liquid crystal molecules.

In an embodiment, the first electrode layer includes a base layer disposed on the display panel and a lower electrode disposed on the base layer.

In an embodiment, the second electrode layer includes a first sub-base layer, a first sub-electrode disposed on the first sub-base layer and that overlaps the first area, a second sub-base layer disposed on the first sub-base layer, and a second sub-electrode disposed on the second sub-base layer and that overlaps the second area.

In an embodiment, the second electrode layer includes a first sub-base layer, a first sub-electrode disposed on the first sub-base layer and that overlaps the first area, and a second sub-electrode disposed on the first sub-base layer and that overlaps the second area. The first sub-electrode and the second sub-electrode are disposed in a same layer.

In an embodiment, the first electrode layer includes a base layer disposed on the display panel, a third sub-electrode disposed on the base layer and that overlaps the first area, and a fourth sub-electrode disposed on the base layer and that overlaps the second area. The third sub-electrode and the fourth sub-electrode are disposed in a same layer.

In an embodiment, the light modulator further includes a diffraction grating layer disposed on the liquid crystal layer and that diffracts light that is output from the display panel and that has passed through the liquid crystal layer.

DETAILED DESCRIPTION

Figure 1:
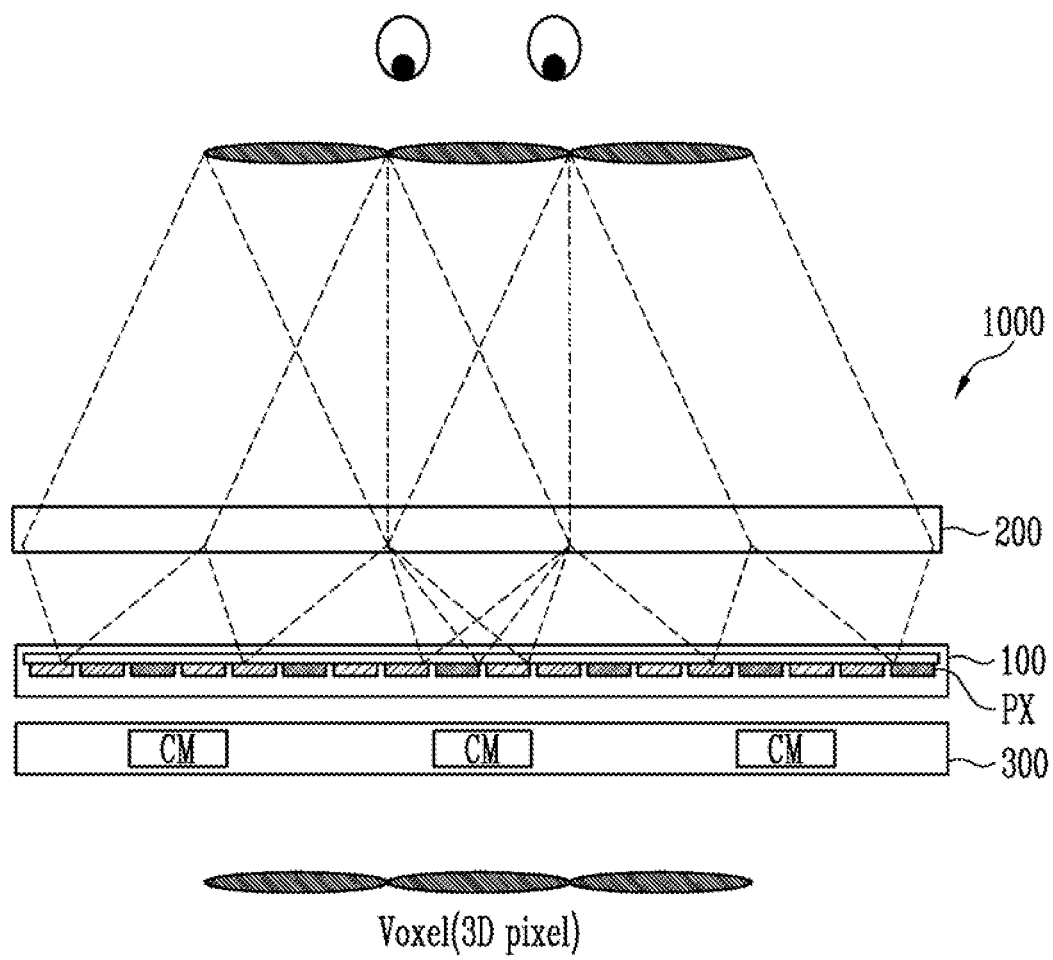
FIG. 1 illustrates a stereoscopic image display device according to an embodiment of the present disclosure.

Hereinafter, embodiments of the present disclosure will be described in detail with reference to the accompanying drawings. The same reference numerals may be used to designate the same or similar components throughout the drawings, and repeated descriptions thereof may be omitted.

Figure 2:
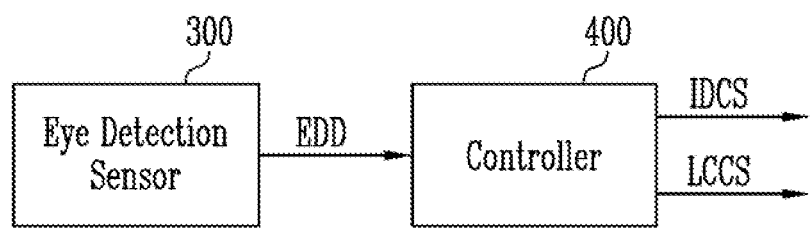
FIG. 2 is a block diagram of an eye detection sensor and a controller in a stereoscopic image display device of FIG. 1.
Figure 3:
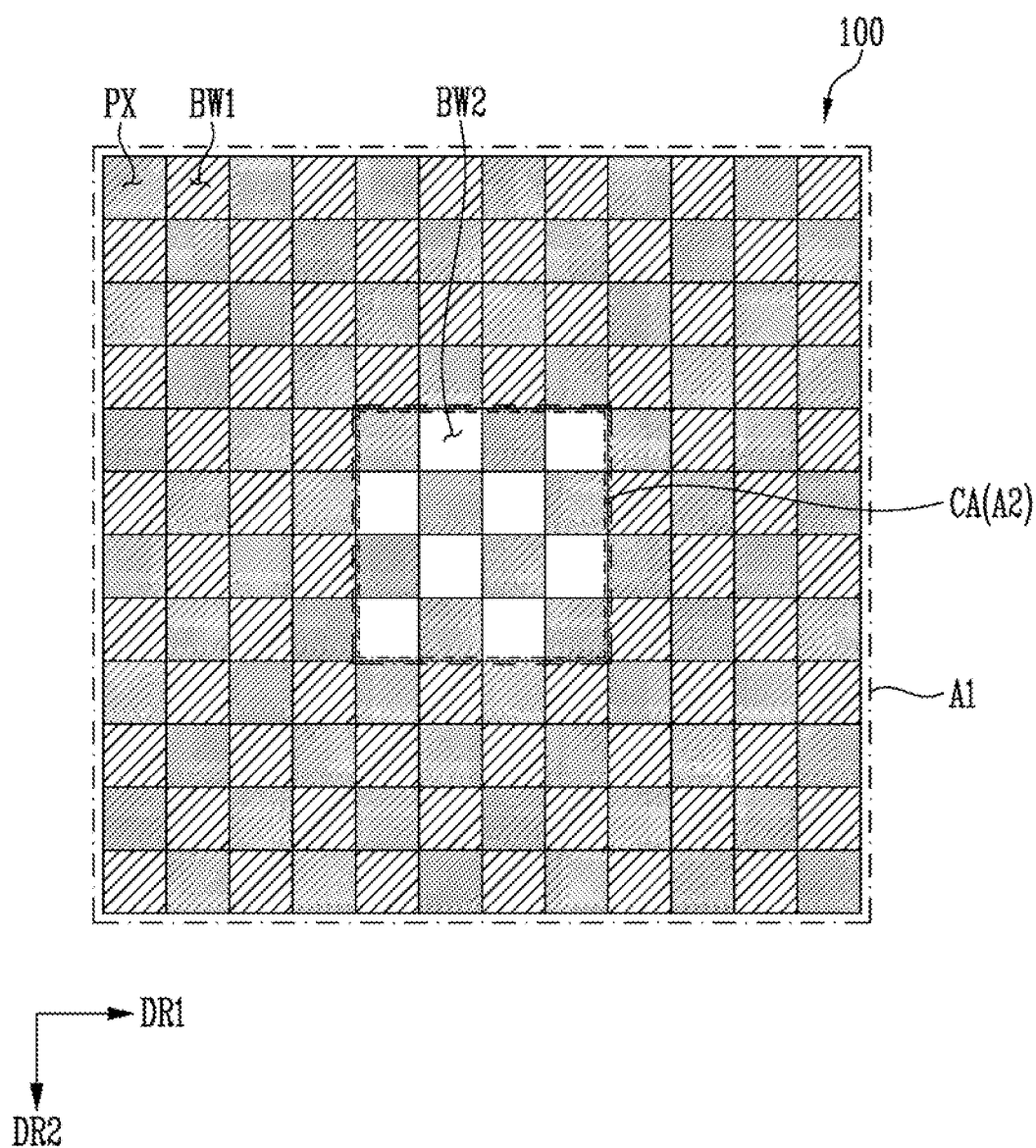
FIG. 3 is a plan view of a display panel in a stereoscopic image display device of FIG. 1.

FIG. 1 illustrates a stereoscopic image display device according to an embodiment of the present disclosure. FIG. 2 is a block diagram of an eye detection sensor and a controller included in a stereoscopic image display device of FIG. 1. FIG. 3 is a plan view of a display panel included in the stereoscopic image display device of FIG. 1.

Referring to FIG. 1, a stereoscopic image display device 1000 according to an embodiment of the present disclosure includes a display panel 100, a light modulator 200, and an eye detection sensor 300. In addition, the stereoscopic image display device 1000 further includes a controller, such as the controller 400 of FIG. 2.

In an embodiment, the stereoscopic image display device 1000 detects information about the positions of a user's eyes and information about the distance therefrom using the eye detection sensor 300. The stereoscopic image display device 1000 displays an image, such as a 3D stereoscopic image or a 2D image, through the display panel 100 in response to the information about the user's eye positions and the distance information, which are detected through the eye detection sensor 300.

In an embodiment, the eye detection sensor 300 includes at least one camera CM. The at least one camera CM captures an image of the user's eyes. For example, light reflected from the user's eyes is provided to the camera CM after passing through a portion of the light modulator 200 and a portion of the display panel 100, and the camera CM captures an image of the user's eyes using the received light. For example, a web camera, a monocular camera, a stereo camera, multiple cameras, a camera capable of measuring depth information, etc., can be used as the camera CM.

According to embodiments, the eye detection sensor 300 or the camera CM is located on the rear side of the display panel 100. Accordingly, the overall size of the stereoscopic image display device 1000 and the size of the bezel thereof are reduced compared to a case in which the eye detection sensor 300 is located outside the display panel 100.

However, although FIG. 1 shows the eye detection sensor 300 as including three cameras CM, embodiment of the present disclosure are not necessarily limited thereto. For example, in some embodiments, the eye detection sensor 300 may include a single camera CM, two cameras CM, or four or more cameras CM.

Referring further to FIG. 2, in an embodiment, the eye detection sensor 300 generates eye detection data EDD based on the image captured by the camera CM. The eye detection sensor 300 provides the eye detection data EDD to the controller 400.

The controller 400 controls the overall operation of the stereoscopic image display device 1000. For example, the controller 400 extracts information about the user's eye positions and distance information from the eye detection data EDD. The information about the user's eye positions corresponds to the positions of the centers of the user's pupils, and the information about the distance from the user's eyes corresponds to the distance from the stereoscopic image display device 1000 to the user's eyes.

In an embodiment, the controller 400 generates image data IDCS and a light modulation control signal LCCS based on the information about the user's eye positions and the distance information. The image data IDCS is provided to a driving circuit, such as a driving circuit that drives the display panel 100, and the light modulation control signal LCCS is provided to the light modulator 200.

Referring again to FIG. 1, the display panel 100 includes pixels PX that display an image by emitting light. In an embodiment, each of the pixels PX emits one of red, green, or blue light. However, the color of light emitted from the pixel PX is not necessarily limited thereto. For example, in other embodiments, other colors of light for full-color implementation can be emitted from the pixels PX.

In an embodiment, the display panel 100 is coupled to a driving circuit that drives the pixels PX. The driving circuit performs the function of at least one of a scan driver, a data driver, or a timing controller.

The driving circuit drives the pixels PX of the display panel 100 based on the image data, such as IDCS of FIG. 2, received from the controller 400 of FIG. 2. For example, the driving circuit provides a scan signal, a data signal, etc., for displaying an image, such as a 3D stereoscopic image or a 2D image, to the pixels PX based on the image data IDCS.

The pixels PX form a light-emitting surface by being disposed on the front side of the display panel 100, and an image is displayed by the pixels PX.

Referring to FIG. 3, in an embodiment, the pixels PX in the display panel 100 are disposed in a grid form by being spaced apart from each other along a first direction DR1 and a second direction DR2 that crosses the first direction DR1.

In an embodiment, the pixels PX are formed in a plurality of pixel rows and a plurality of pixel columns. Here, each of the pixel rows is a group of pixels coupled to the same scan line, and each of the pixel columns is a group of pixels coupled to the same data line. For example, a pixel row is defined by pixels PX arranged in the first direction DR1, and a pixel column is defined by pixels PX arranged in the second direction DR2. However, embodiments are not necessarily limited thereto. In an embodiment, the pixel rows are arranged along the second direction DR2, and the pixel columns are arranged along the first direction DR1.

The display panel 100 includes a first area A1 and a second area A2 or a camera area CA. The camera area CA overlaps an area in which the camera CM in the eye detection sensor 300 is disposed. Hereinbelow, for conciseness of description, the second area A2 will be referred to as the camera area CA In an embodiment, the display panel 100 further includes a first lattice member BW1 and a second lattice member BW2.

In an embodiment, the first lattice member BW1 is disposed in the first area A1. For example, the first lattice member BW1 and the pixels PX are alternately disposed in the first area A1. For example, the pixels PX are spaced apart from each other in the first and second directions DR1 and DR2 in the first area A1, and the first lattice member BW1 is disposed between the spaced apart pixels PX in the first area A1.

The first lattice member BW1 is formed of an organic layer, such as polyacrylate resin, epoxy resin, phenolic resin, polyimide resin, or polyimide resin, etc.

In an embodiment, the first lattice member BW1 absorbs externally incident light by including a light-absorbing material or a light absorbent applied thereto. For example, the first lattice member BW1 includes a carbon-based black pigment. However, embodiments are not necessarily limited thereto, an in an embodiment, the first lattice member BW1 may alternatively include an opaque metal that has a high light absorptivity, such as chrome (Cr), molybdenum (Mo), an alloy of molybdenum and titanium (MoTi), tungsten (W), vanadium (V), niobium (Nb), tantalum (Ta), manganese (Mn), cobalt (Co), or nickel (Ni).

In an embodiment, the second lattice member BW2 is disposed in the camera area CA. For example, the second lattice member BW2 and the pixels PX are alternately disposed in the camera area CA. For example, the pixels PX are spaced apart from each other in the first and second directions DR1 and DR2 in the camera area CA, and the second lattice member BW2 is disposed between the spaced apart pixels PX in the camera area CA.

In an embodiment, the second lattice member BW2 is formed of a light-transmissive material. For example, the second lattice member BW2 is formed of a polymer organic material. The polymer organic material is at least one of a polyacrylate resin, an epoxy resin, polyimide, or polyethylene. However, the material of the second lattice member BW2 is not necessarily limited thereto.

Because the second lattice member BW2 is formed of a light-transmissive material, when the camera CM captures an image of the user's eyes, a path is formed along which light reflected from the user's eyes propagate through the display panel 100 to the camera CM.

Referring again to FIG. 1, the display panel 100 includes a display layer disposed on a substrate that configures the pixels PX. The display layer includes a pixel circuit layer and a display element layer. The display panel 100 further includes an encapsulation structure that encapsulates the display element layer. In addition, the display panel 100 further includes a polarization layer that includes a phase retarder and/or a polarizer on the encapsulation structure.

The pixel circuit layer includes a pixel circuit that drives the light-emitting element of the pixel PX. For example, the pixel circuit layer includes transistors along with signal lines and power lines coupled thereto. The pixel circuit layer has a stacked structure that forms the transistors.

The display element layer is disposed on the pixel circuit layer. The display element layer includes light-emitting elements. The light-emitting elements are electrically connected to the pixel circuits of the pixel circuit layer. In an embodiment, the light-emitting elements are self-emissive elements. A self-emissive element may be one of an organic light-emitting element, an inorganic light-emitting element, or a light-emitting element that is formed of an inorganic material and an organic material. For example, the display panel 100 is a self-emissive display panel. However, embodiments are not necessarily limited thereto, and in an embodiment, the light-emitting element includes a light-emitting element, such as a quantum dot display element, that emits light by changing the wavelength of emitted light using quantum dots.

In addition, in embodiments, the display panel 100 may be implemented as a liquid crystal display panel, a plasma display panel, a display panel that displays an image using quantum dots, etc.

The light modulator 200 is disposed on the display panel 100.

The display panel 100 and the light modulator 200 can operate in a 2D image display mode or a 3D image display mode under the control of the controller 400. For example, the controller 400 controls the light modulator 200 to control the path of light output from the display panel 100, thereby displaying a 2D image or a 3D image.

According to embodiments, the light modulator 200 includes a liquid crystal layer. The liquid crystal layer includes liquid crystal molecules whose alignment direction is controlled depending on a voltage or an electric field applied thereto. The alignment direction of the liquid crystal molecules is controlled by controlling the voltage or electric field applied to the liquid crystal layer based on the light modulation control signal LCCS, cf. FIG. 2 received from the controller 400 according to the image display mode, whereby the liquid crystal layer of the light modulator 200 transmits light received from the display panel 100 by polarizing the same in a horizontal or vertical direction. A horizontal direction is a parallel to a surface of the light modulator 200, and a vertical direction is a thickness direction that is normal to the surface of the light modulator 200.

The configuration that controls the alignment direction of the liquid crystal molecules in the liquid crystal layer of the light modulator 200 according to the image display mode will be described in detail with reference to FIGS. 6A to 6C.

In an embodiment, the light modulator 200 includes a diffraction grating layer that diffracts or refracts light received from the pixels PX. For example, the diffraction grating layer includes a transparent diffraction grating that changes the direction of light by diffracting light received from the pixels PX.

A light field display is a 3D display that realizes a stereoscopic image by forming a light field expressed as a vector distribution of light in a space using a flat panel display and optical elements, such as the diffraction grating layer of the light modulator 200, and where each vector includes a strength and a direction. A light field display realizes a more natural stereoscopic image by making the depth and side surfaces of an object visible therethrough, and is a technology expected to be used with Augmented Reality (AR) technology.

A light field can be implemented in various ways. For example, a light field can be formed by forming light fields in different directions using a plurality of projectors, by controlling the direction of light using a diffracting grating, by adjusting the direction and strength (luminance) of light based on a combination of pixels using two or more panels, by controlling the direction of light using a pinhole or a barrier, or by controlling the direction of light refraction using a lens array, etc.

In an embodiment, as described above, the stereoscopic image display device 1000 that uses a diffraction grating displays a stereoscopic 3D image by forming a light field.

Light emitted from the pixels PX propagates in a specific direction by being diffracted (or refracted) by the diffraction grating layer in the light modulator 200, thereby forming a light field expressed by the strength and direction of light. When a viewer views the stereoscopic image display device in the light field formed in this way, the viewer perceives the corresponding image in 3D.

The image information based on the viewer's viewpoint in the light field is defined and processed in units of voxels. A voxel is a unit of graphics information that defines a point (or pixel) in a 3D space.

The shape, pattern, etc., of the diffraction grating in the diffraction grating layer is set depending on conditions such as the sizes of the pixels PX, the arrangement structure of the pixels PX, the size of a pixel area in which the pixels PX are disposed, a viewing distance, resolution, etc.

Figure 4:
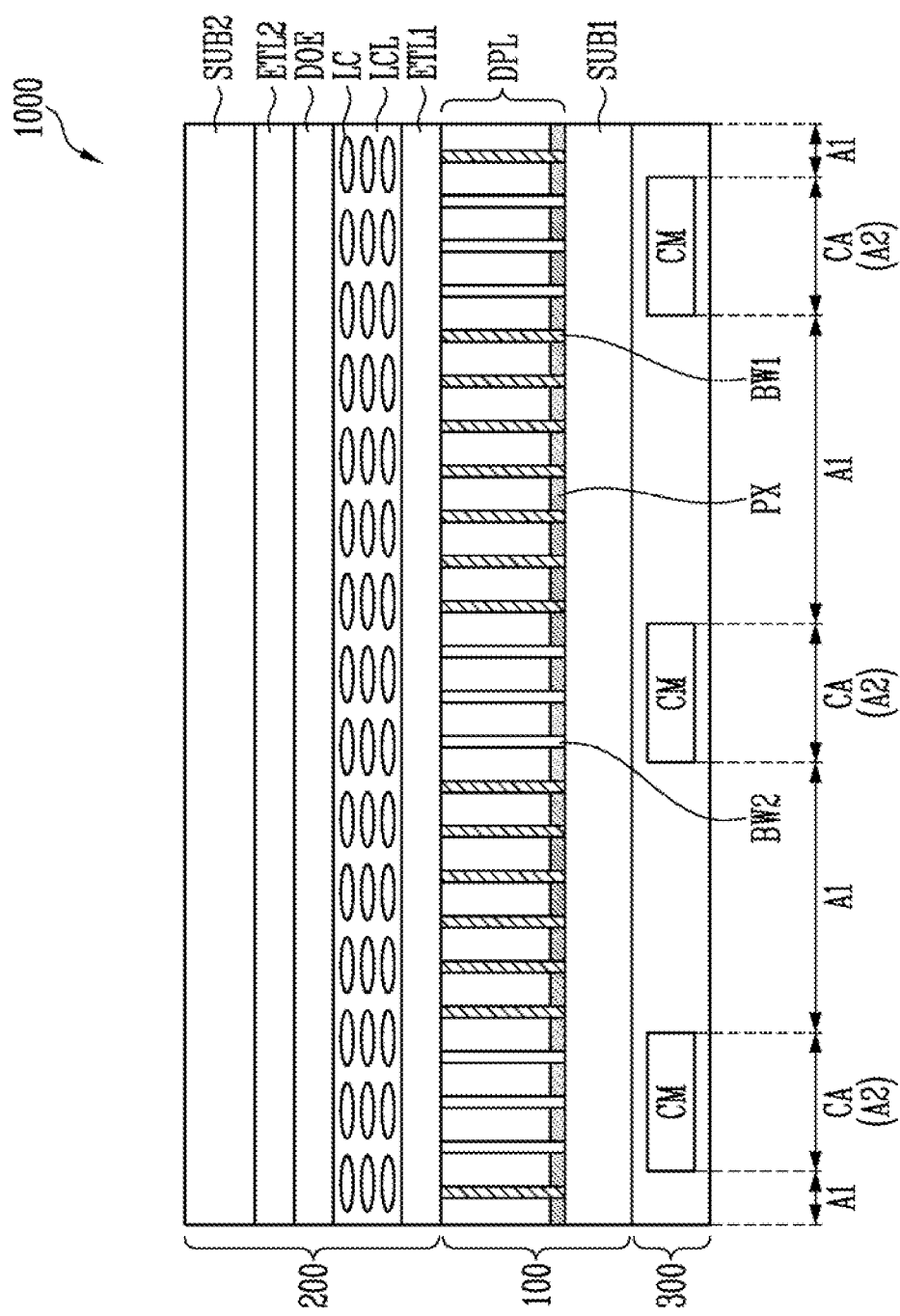
FIG. 4 is a sectional view of a stereoscopic image display device according to an embodiment of the present disclosure.
Figure 5:
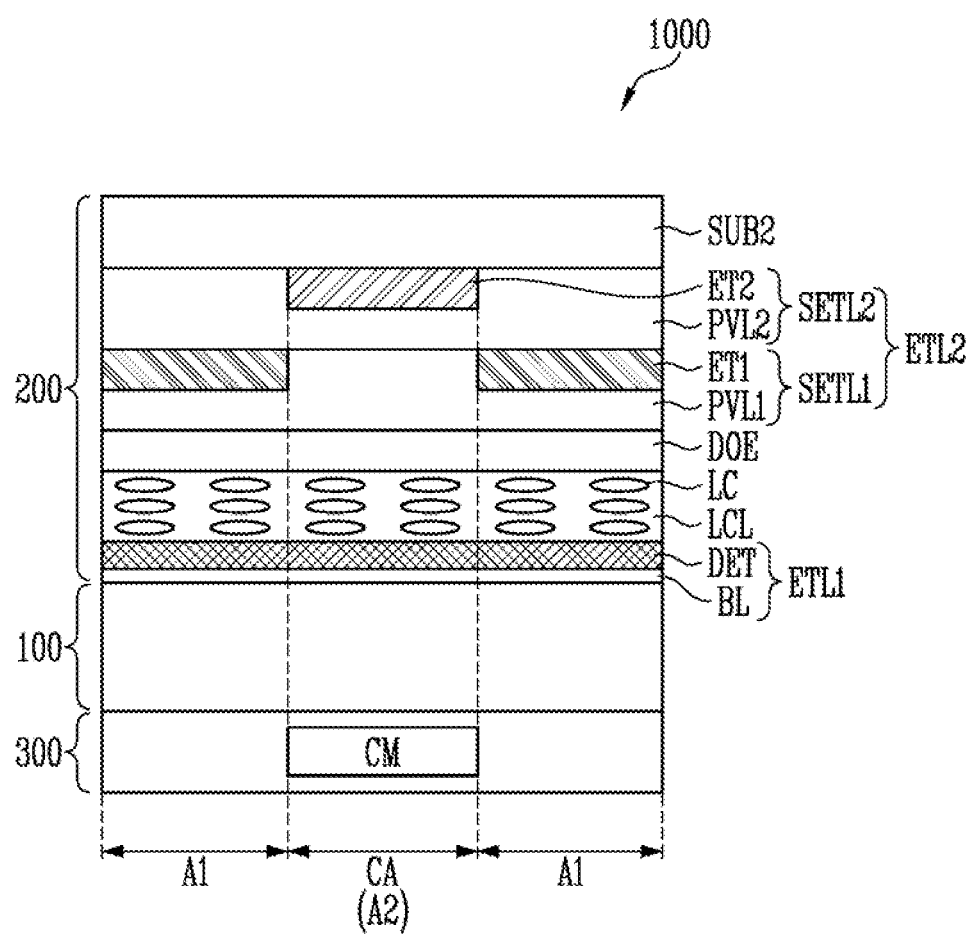
FIG. 5 is a sectional view of a stereoscopic image display device of FIG. 4.

FIG. 4 is a sectional view of a stereoscopic image display device according to an embodiment of the present disclosure. FIG. 5 is a sectional view of of a stereoscopic image display device of FIG. 4. In particular, FIG. 5 is a sectional view of the stereoscopic image display device 1000 corresponding to an area in which a single camera CM is disposed, such as a single camera area CA.

Referring to FIGS. 1 to 5, in an embodiment, the stereoscopic image display device 1000 includes a display panel 100 and a light modulator 200. In addition, the stereoscopic image display device 1000 further includes an eye detection sensor 300. The eye detection sensor 300 or camera CM is disposed on the rear side of the display panel 100.

The display panel 100 includes a first substrate SUB1 and a display layer DPL.

The first substrate SUB1 is a base member of the display panel 100, and is a substantially transparent light-transmissive substrate. The first substrate SUB1 may be a rigid substrate that includes glass or reinforced glass, or a flexible substrate made of plastic. However, the material of the first substrate SUB1 is not necessarily limited thereto, and the first substrate SUB1 may be formed of other materials.

The display layer DPL includes pixels PX, first lattice members BW1, and second lattice members BW2. As described with reference to FIG. 1 and FIG. 3, the first lattice members BW1 are disposed between the pixels PX in the first area A1, and the second lattice members BW2 are disposed between the pixels PX in the camera area CA.

The light modulator 200 is disposed on the display panel 100.

The light modulator 200 includes a first electrode layer ETL1, a liquid crystal layer LCL, a diffraction grating layer DOE, a second electrode layer ETL2, and a second substrate SUB2.

The first electrode layer ETL1 includes a base layer BL and a lower electrode DET.

In an embodiment, the base layer BL is formed of a transparent insulating material. For example, the base layer BL is made of organic matter selected from polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (SAC), or cellulose acetate propionate (CAP).

In an embodiment, the base layer BL is an inorganic material. For example, the base layer BL includes one or more of a silicon nitride layer, a silicon oxynitride layer, a silicon oxide layer, a titanium oxide layer, or an aluminum oxide layer, etc.

The lower electrode IDET is disposed on the base layer BL. The lower electrode DET includes a transparent conductive material such as ITO. A reference voltage, based on which driving of the liquid crystal layer LCL is turned on or off, is supplied to the lower electrode DET.

In an embodiment, at least one of a lower alignment layer that covers the lower electrode DET and a lower insulating layer are further disposed on the lower electrode DET.

The second electrode layer ETL2 is disposed on liquid crystal layer LCL and faces the first electrode layer ETL1.

In an embodiment, the second electrode layer ETL2 includes a first sub-electrode layer SETL1 and a second sub-electrode layer SETL2.

The first sub-electrode layer SETL1 includes a first sub-base layer PVL1 and a first sub-electrode ET1 disposed on the first sub-base layer PVL1.

The first sub-base layer PVL1 includes a material that is substantially the same as or similar to the material of the base layer BL. For example, the first sub-base layer PVL1 may be formed of a transparent insulating material, or may include an inorganic material, but embodiments are not necessarily limited thereto.

In an embodiment, the first sub-electrode ET1 overlaps the first area A1, but does not overlap the second area A2.

The first sub-electrode ET1 includes a transparent conductive material such as ITO. A driving voltage that turns the liquid crystal layer LCL of the first area A1 on or off is supplied to the first sub-electrode ET1. For example, depending on whether a driving voltage is applied to the first sub-electrode ET1, an electric field is formed between the lower electrode (DET) of the first area A1 and the first sub-electrode ET1, and the alignment direction of the liquid crystal molecules LC of the first area A1 in the liquid crystal layer LCL is controlled.

However, embodiments are not necessarily limited thereto, and a driving voltage and a reference voltage may be respectively supplied to the lower electrode layer DET and the first sub-electrode ET1.

The second sub-electrode layer SETL2 is disposed on the first sub-electrode layer SETL1.

The second sub-electrode layer SETL2 includes a second sub-base layer PVL2 and a second sub-electrode ET2 disposed on the second sub-base layer PVL2.

The second sub-base layer PVL2 is disposed on the first sub-electrode layer SETL1, and includes a material that is substantially the same as or similar to the material of the base layer BL. For example, the second sub-base layer PVL2 may be formed of a transparent insulating material, or may include an inorganic material, but embodiments are not necessarily limited thereto.

In an embodiment, the second sub-electrode ET2 overlaps the camera area CA, but does not overlap the first area A1. For example, the first sub-electrode ET1 and the second sub-electrode ET2 do not overlap each other.

The second sub-electrode ET2 includes a transparent conductive material, such as ITO. A driving voltage that turns the liquid crystal layer LCL of the camera area CA on or off is supplied to the second sub-electrode ET2. For example, depending on whether a driving voltage is applied to the second sub-electrode ET2, an electric field is formed between the lower electrode layer DET of the camera area CA and the second sub-electrode ET2, and the alignment direction of the liquid crystal molecules LC of the camera area CA in the liquid crystal layer LCL is controlled.

However, embodiments are not necessarily limited thereto, and a driving voltage and a reference voltage may be respectively supplied to the lower electrode layer DET and the second sub-electrode ET2.

The liquid crystal layer LCL is disposed between the first electrode layer ETL1 and the second electrode layer ETL2, and the diffraction grating layer DOE is disposed between the liquid crystal layer LCL and the second electrode layer ETL2. The liquid crystal layer LCL includes liquid crystal molecules LC whose alignment direction is controlled by varying the voltage that is applied to the second electrode layer ETL2. For example, the alignment direction of the liquid crystal molecules LC that overlap the first area A1 is controlled by varying the driving voltage applied to the first sub-electrode ET1 of the first sub-electrode layer SETL1, and the alignment direction of the liquid crystal molecules LC that overlap the camera area CA is controlled by varying the driving voltage applied to the second sub-electrode ET2 of the second sub-electrode layer SETL2.

In an embodiment, the liquid crystal layer LCL is driven in a vertical alignment (VA) liquid crystal mode. However, embodiments are not necessarily limited thereto, and in an embodiment, the liquid crystal layer LCL is driven in an alternative crystal liquid mode, such as one of a twisted nematic (TN) mode, an optical compensated bend (OCB) mode, an electrically controlled birefringence (ECB) mode, etc.

For example, when no electric field is applied to liquid crystal molecules LC, the liquid crystal molecules LC are arranged or aligned in a vertical direction. Accordingly, the liquid crystal layer LCL are arranged to transmit light received from the display panel 100 without change. The light passing through the liquid crystal layer LCL is provided to the diffraction grating layer DOE, and an image is displayed in a 2D image display mode.

In addition, when no electric field is applied to the liquid crystal molecules LC, because the liquid crystal molecules LC are arranged in a vertical direction, the liquid crystal layer LCL transmits light reflected from a user's eyes without change along the path along which the light reflected from the user's eyes is provided to the camera CM of the eye detection sensor 300. Accordingly, the camera CM can capture an image of the user's eyes using the received light.

Conversely, in a 3D stereoscopic image display mode, a driving voltage is applied to the first sub-electrode ET1 and/or the second sub-electrode ET2, and an electric field is formed between the first sub-electrode ET1 and the lower electrode DET and/or between the second sub-electrode ET2 and the lower electrode DET. The liquid crystal molecules LC are arranged by the electric field to linearly polarize incident light in a horizontal direction. The linearly polarized light is incident on the diffraction grating layer DOE, and the light diffracted or refracted in the diffraction grating layer DOE is divided along light travel paths that respectively correspond to a right-eye image and a to a left-eye image so as to converge on different focal points, so that a stereoscopic image is realized.

The diffraction grating layer DOE forms a light field by diffracting (or refracting) light received from the liquid crystal layer LCL. For example, the diffraction grating layer DOE may include a surface-relief-type or a volumetric-grating-type transmissive diffraction grating that can change the direction of light by diffracting light received from the display panel 100, but the form of the diffraction grating is not necessarily limited thereto.

In an embodiment, at least one of an upper alignment layer and an upper insulating layer is further disposed between the diffraction grating layer DOE and the liquid crystal layer LCL.

The second substrate SUB2 is disposed on the second electrode layer ETL2. The second substrate SUB2 protects components disposed thereunder, such as the first electrode layer ETL1 the second electrode layer ETL2, the liquid crystal layer LCL, the diffraction grating layer DOE, etc., from external contamination, shocks, scratches, etc.

In an embodiment, the second substrate SUB2 is formed of a transparent insulating material. The second substrate SUB2 includes a material that is substantially the same as or similar to the material of the base layer BL. For example, the second substrate SUB2 may be formed of a transparent insulating material, or may include an inorganic material, but embodiments are not necessarily limited thereto.

Figure 6A:
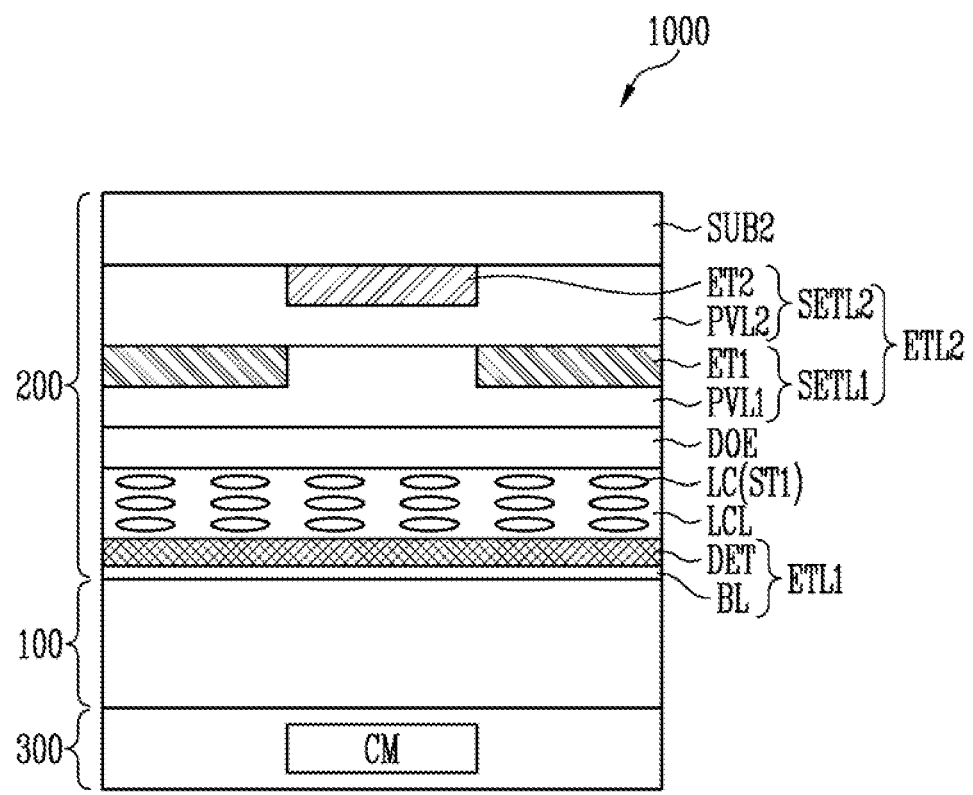
FIGS. 6A to 6C illustrate the operation of a stereoscopic image display device of FIG. 5.
Figure 6B:
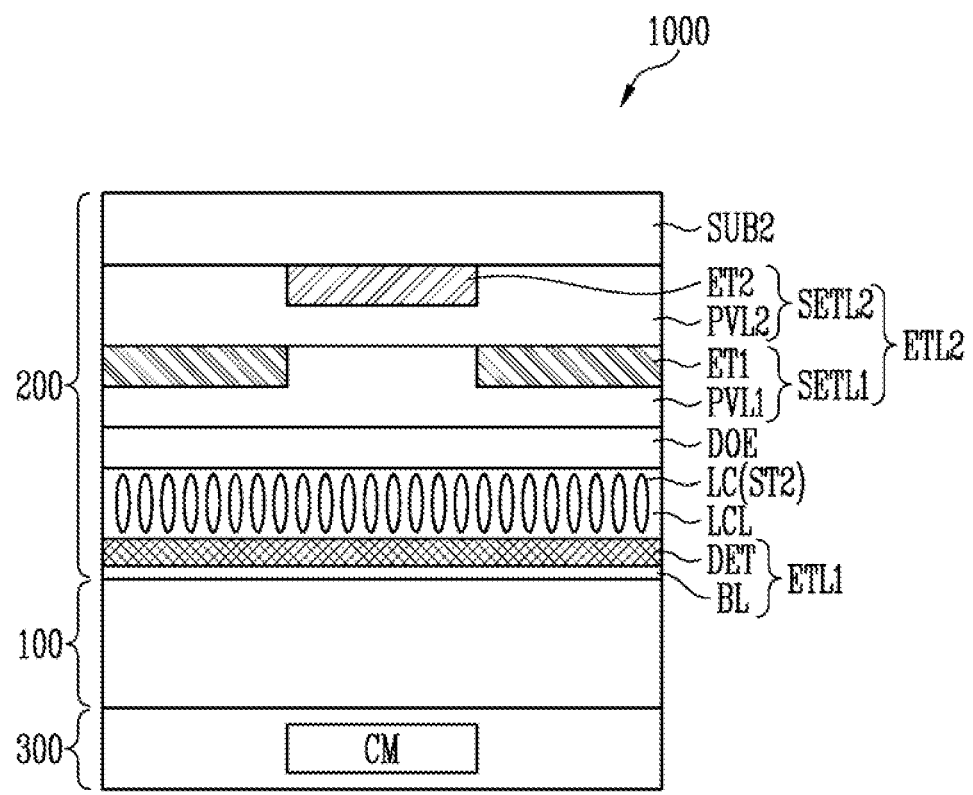
Figure 6C:
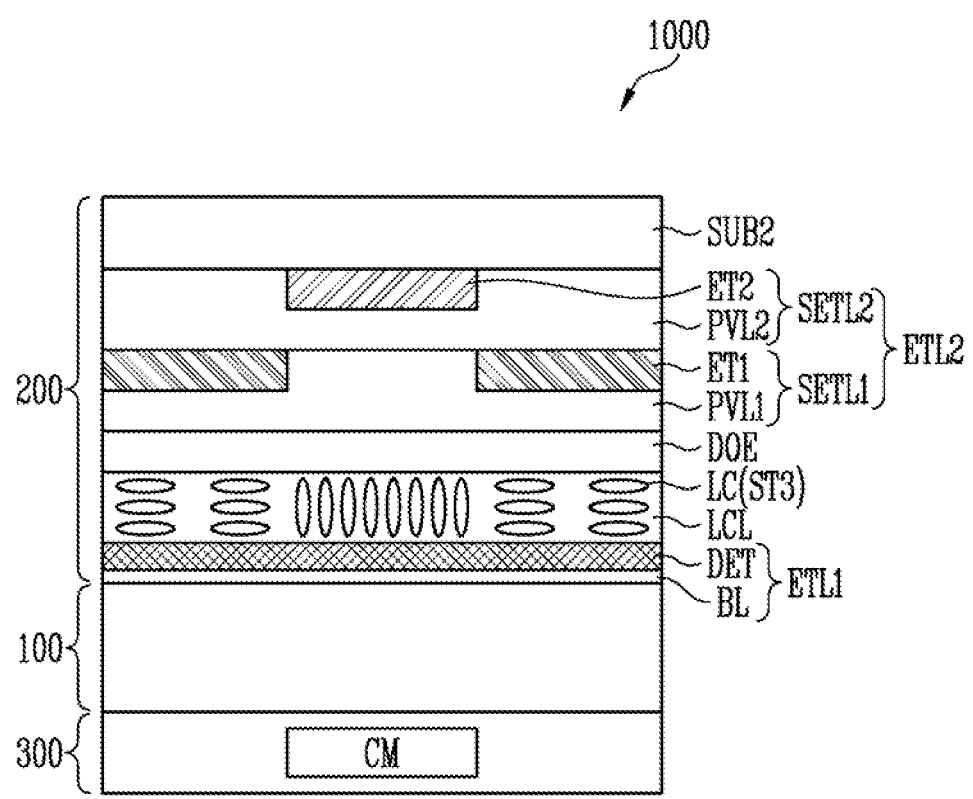

FIGS. 6A to 6C illustrate the operation of a stereoscopic image display device of FIG. 5.

FIG. 6A illustrates a stereoscopic image display device 1000 in a first mode, FIG. 6B illustrates the stereoscopic image display device 1000 in a second mode, and FIG. 6C illustrates the stereoscopic image display device 1000 in a third mode. The first mode is that in which the stereoscopic image display device 1000 operates in a 3D image display mode, the second mode is that in which the stereoscopic image display device 1000 operates in a 2D image display mode, and the third mode is that in which a camera CM captures an image of a user's eyes while the stereoscopic image display device 1000 is operating in a 3D image display mode.

Referring to FIG. 1, FIGS. 3 to 5, and FIG. 6A, in an embodiment, in the first mode, a driving voltage is applied both to a first sub-electrode ET1 and to a second sub-electrode ET2. When a driving voltage is applied to the first sub-electrode ET1, an electric field is formed in a first area A1 between the first sub-electrode ET1 and the lower electrode DET, so that liquid crystal molecules LC that overlap the first area A1 are aligned by the electric field to linearly polarize incident light in a horizontal direction. In addition, when a driving voltage is applied to the second sub-electrode ET2, an electric field is formed in a camera area CA between the second sub-electrode ET2 and the lower electrode layer DET, so that liquid crystal molecules LC that overlap the camera area CA are aligned by the electric field to linearly polarize incident light in the horizontal direction. For example, liquid crystal molecules LC over the entire area of a crystal liquid layer, including both the first area A1 and the camera area CA, are aligned in a first state ST1 that linearly polarizes incident light in the horizontal direction, and light received from the display panel 100 is linearly polarized in the horizontal direction. Accordingly, the linearly polarized light is incident on a diffraction grating layer DOE and is diffracted (or refracted), so that a stereoscopic image (3D image) is realized in the 3D image display mode.

Referring to FIG. 6B, in an embodiment, in the second mode, no driving voltage is applied to either the first sub-electrode ET1 or to the second sub-electrode ET2. No electric field is applied to liquid crystal molecules LC in the first area A1 and the camera area CA, so that the liquid crystal molecules LC are aligned in a second state ST2 in a vertical direction. Accordingly, light received from the display panel 100 is incident on the liquid crystal layer LCL and the diffraction grating layer DOE, and a 2D image is realized in the 2D image display mode.

Referring to FIG. 6C, in an embodiment, in the third mode, a driving voltage is applied to the first sub-electrode ET1 but not to the second sub-electrode ET2. When a driving voltage is applied to the first sub-electrode ET1, an electric field is formed in the first area A1 between the first sub-electrode ET1 and the lower electrode DET, so that liquid crystal molecules LC that overlap the first area A1 are aligned by the electric field to linearly polarize incident light in the horizontal direction. Accordingly, light received from pixels PX that overlap the first area A1 is linearly polarized in the horizontal direction, and the linearly polarized light is incident on the diffraction grating layer DOE and is diffracted (or refracted), so that a stereoscopic image (3D image) is realized.

Conversely, because no driving voltage is applied to the second sub-electrode ET2, no electric field is applied to liquid crystal molecules LC that overlap the camera area CA, so that the liquid crystal molecules LC that overlap the camera area CA are in a third state ST3 and aligned in the vertical direction. In the third mode, the camera CM operates, and light reflected from a user's eyes is provided through the light modulator 200 and the display panel 100 to the camera CM. The liquid crystal molecules LC of the liquid crystal layer LCL that overlap the camera CM and the camera area CA are aligned in the vertical direction, so that light reflected from a user's eyes is provided to the camera CM by passing through the liquid crystal layer LCL in the camera area CA without change. Accordingly, the camera CM can capture an image of the user's eye using the received light.

In addition, as described above with reference to FIG. 2 and FIG. 4, because a second lattice member BW2 that includes a light-transmissive material is disposed between the pixels PX and overlaps the camera area CA, when light reflected from the user's eyes is provided to the camera CM, light loss is prevented by the lattice member.

Meanwhile, the pixels PX on the display panel 100 that overlap the camera area CA do not operate in the third mode. For example, the pixels PX on the display panel 100 that overlap the camera area CA do not emit light in the third mode. Accordingly, light reflected from the user's eyes is protected from interference from light emitted by the pixels on the light propagation path from the user's eyes of the user to the camera CM, so that the image capture characteristics of the camera CM are further improved.

As described above with reference to FIGS. 1 to 6C, in some embodiments, the second electrode layer ETL2 of the light modulator 200 includes the first sub-electrode layer SETL1 that includes the first sub-electrode ET1 that overlaps the first area A1, and the second sub-electrode layer SETL2 that includes the second sub-electrode ET2 that overlaps the camera area CA. Since the stereoscopic image display device 1000 according to an embodiment of the present disclosure separately controls the first sub-electrode ET1 and the second sub-electrode ET2 of the upper electrodes, an image of the user's eyes can be captured while a 3D image is displayed in a mode in which the camera CM operates, such as the third mode, thereby providing the user with a 3D image that corresponds to information about the user's eye positions and information about the distance therefrom. Accordingly, the quality of the image provided to the user is improved.

In an embodiment, the camera CM or the eye detection sensor 300 is located on the rear side of the display panel 100, whereby the overall size of the stereoscopic image display device 1000 and the size of the bezel thereof are reduced compared to the case in which the camera CM is located outside the display panel 100.

Figure 7:
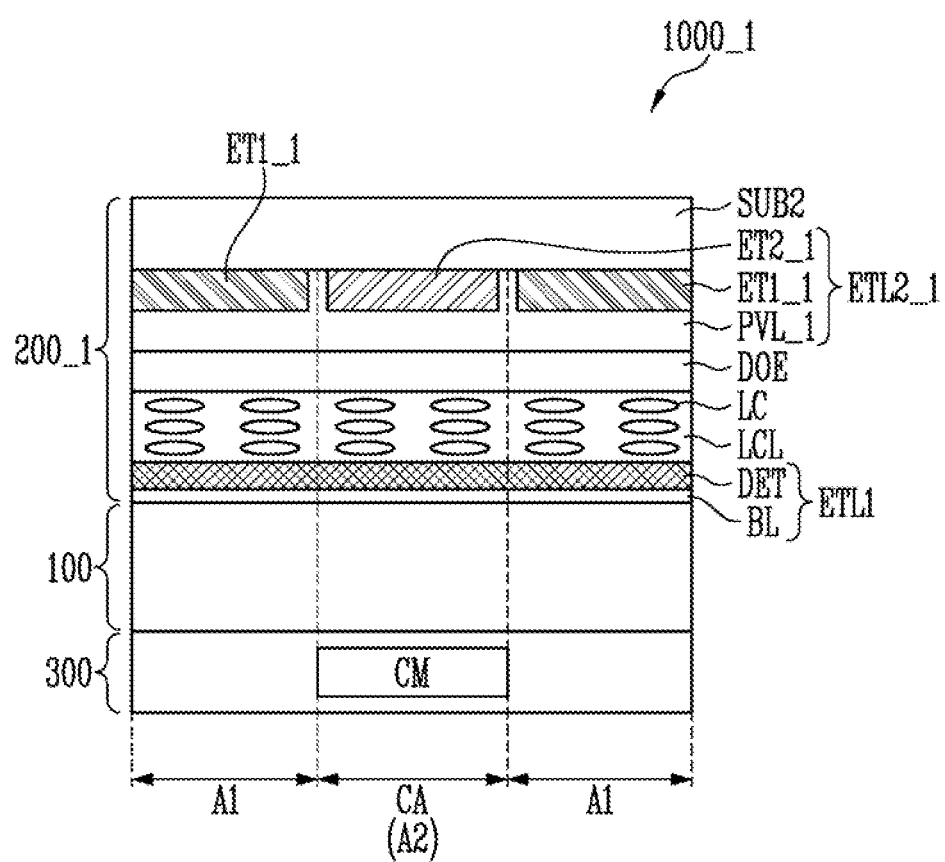
FIG. 7 is a sectional view of a stereoscopic image display device of FIG. 4.
Figure 8:
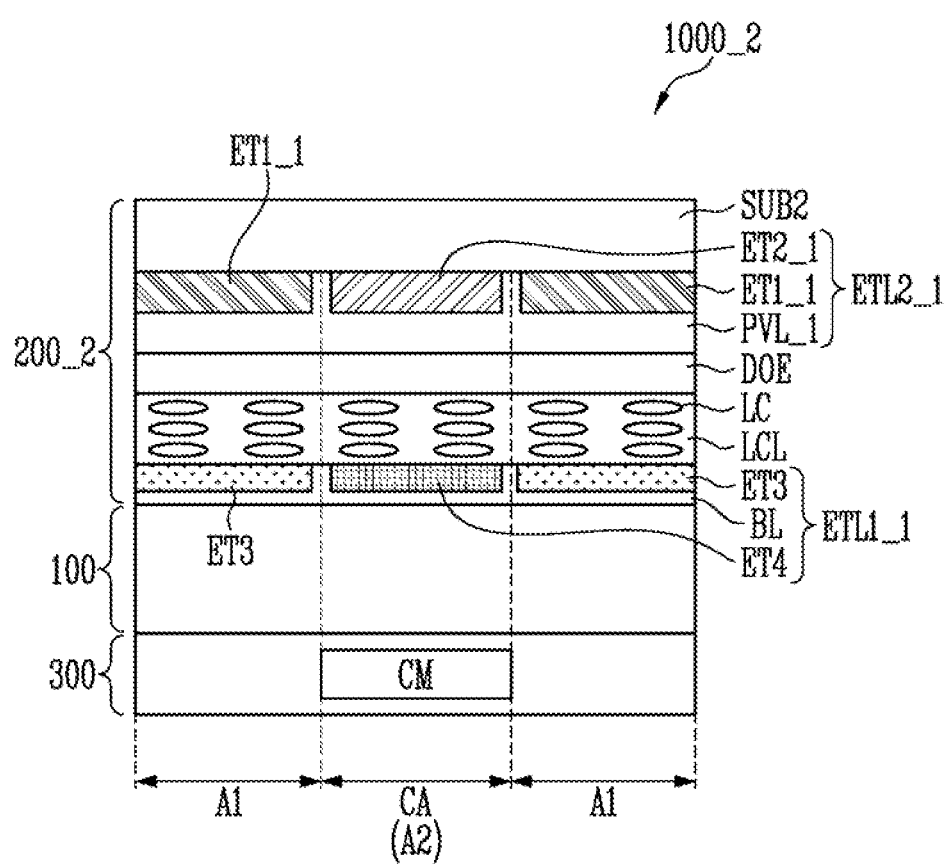
FIG. 8 is a sectional view of a stereoscopic image display device of FIG. 4.

FIG. 7 is a sectional view of a stereoscopic image display device of FIG. 4. FIG. 8 is a sectional view i of a stereoscopic image display device of FIG. 4.

FIG. 7 illustrates a modification of an embodiment of FIG. 5 with regard to a second electrode layer ETL2_1, and FIG. 8 illustrates a modification of an embodiment of FIG. 5 with regard to a first electrode layer ETL1_1 and a second electrode layer ETL2_1.

A description of FIG. 7 and FIG. 8 will focus on differences from embodiments described above to avoid a repeated description where the same reference numerals may refer to the same components, and similar reference numerals may refer to similar components.

Referring to FIG. 4 and FIG. 7, in an embodiment, the stereoscopic image display device 1000_1 includes a display panel 100 and a light modulator 200_1.

The light modulator 200_1 includes a first electrode layer ETL1, a liquid crystal layer LCL, a diffraction grating layer DOE, a second electrode layer ETL2_1, and a second substrate SUB2.

The second electrode layer ETL2_1 includes a first sub-base layer PVL1_1, a first sub-electrode ET1_1, and a second sub-electrode ET2_1.

In an embodiment, the first sub-electrode ET1_1 and the second sub-electrode ET2_1 are disposed in a same layer on the first sub-base layer PVL1_1.

In an embodiment, the first sub-electrode ET1_1 overlaps a first area A1 but does not overlap a camera area CA. In addition, the second sub-electrode ET2_1 overlaps the camera area CA but does not overlap the first area A1. For example, the first sub-electrode ET1_1 and the second sub-electrode ET2_1 are alternately disposed and do not overlap each other by being spaced apart from each other on the same layer.

The first sub-electrode ET1_1 and the second sub-electrode ET2_1 are disposed on the same layer, so that the overall thickness of the light modulator 200 can be reduced.

Referring to FIG. 4 and FIG. 8, in an embodiment, the stereoscopic image display device 1000_2 includes a display panel 100 and a light modulator 200_2.

The light modulator 200_2 includes a first electrode layer ETL1_1, a liquid crystal layer LCL, a diffraction grating layer DOE, a second electrode layer ETL2_1, and a second substrate SUB2. The second electrode layer ETL2_1 is substantially the same as or similar to the second electrode layer ETL2_1 described with reference to FIG. 7, and thus a repeated description will be omitted.

The first electrode layer ETL1_1 includes a base layer BL, a third sub-electrode ET3, and a fourth sub-electrode ET4.

In an embodiment, the third sub-electrode ET3 and the fourth sub-electrode ET4 are disposed in a same layer on the base layer BL.

In an embodiment, the third sub-electrode ET3 overlaps a first area A1 but does not overlap a camera area CA. For example, the third sub-electrode ET3 overlaps the first sub-electrode ET1_1 of the second electrode layer ETL2_1.

In an embodiment, the fourth sub-electrode ET4 overlaps the camera area CA but does not overlap the first area A1. For example, the fourth sub-electrode ET4 overlaps the second sub-electrode ET2_1 of the second electrode layer ETL2_1.

For example, the third sub-electrode ET3 and the fourth sub-electrode ET4 are alternately disposed and do not overlap each other by being spaced apart from each other on the same layer.

As described above, because not only the second electrode layer ETL2_1, to which a driving voltage is applied, but also the first electrode layer ETL1_1, to which a reference voltage is applied, includes the third sub-electrode ET3 and the fourth sub-electrode ET4 that respectively overlap the first area A1 and the camera area CA by being spaced apart from each other, the alignment direction of the liquid crystal molecules LC in the respective areas, e.g., the first area A1 and the camera area CA, can be more precisely controlled.

Figure 9:
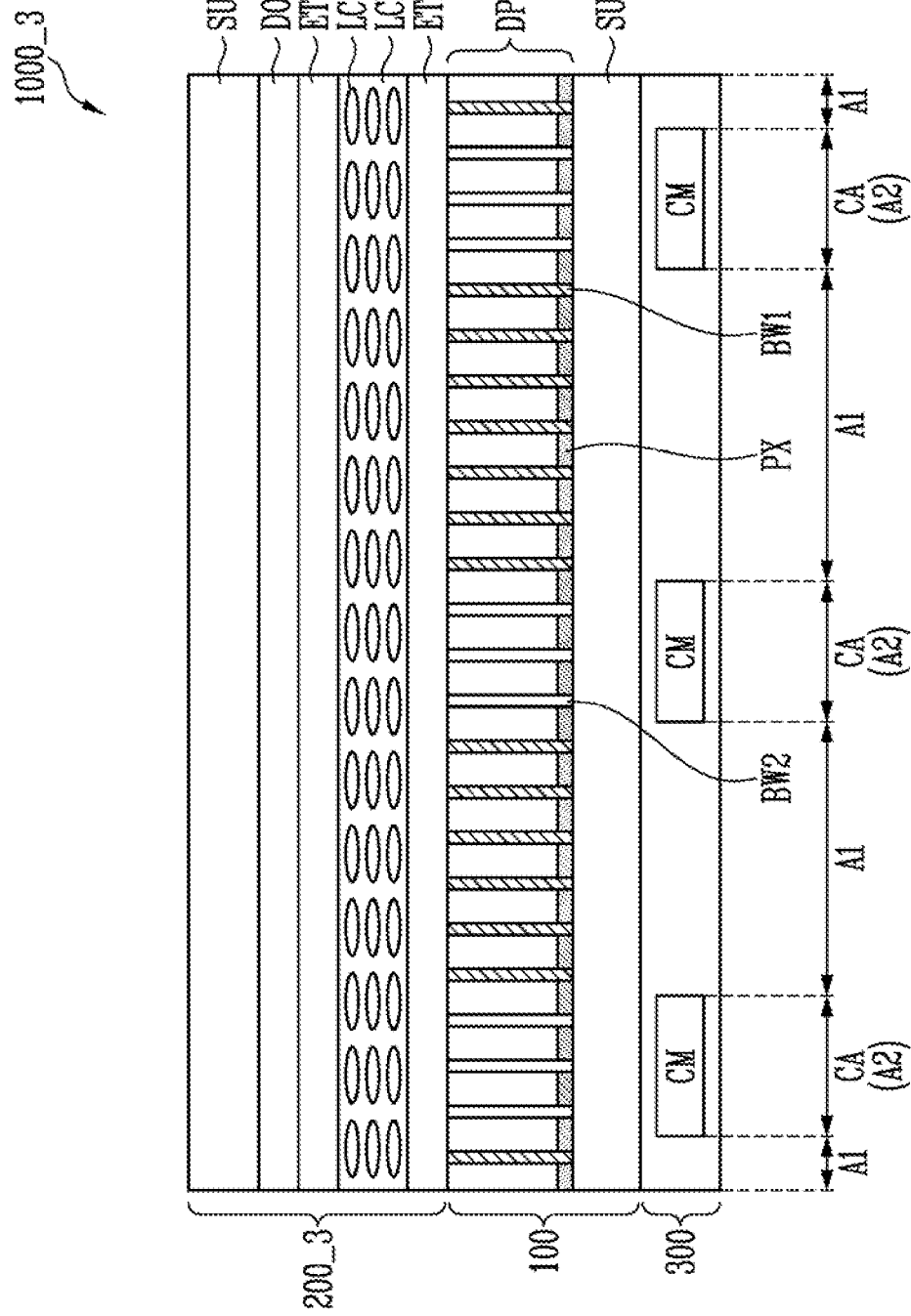
FIG. 9 is a sectional view of a stereoscopic image display device according to an embodiment of the present disclosure.
Figure 10:
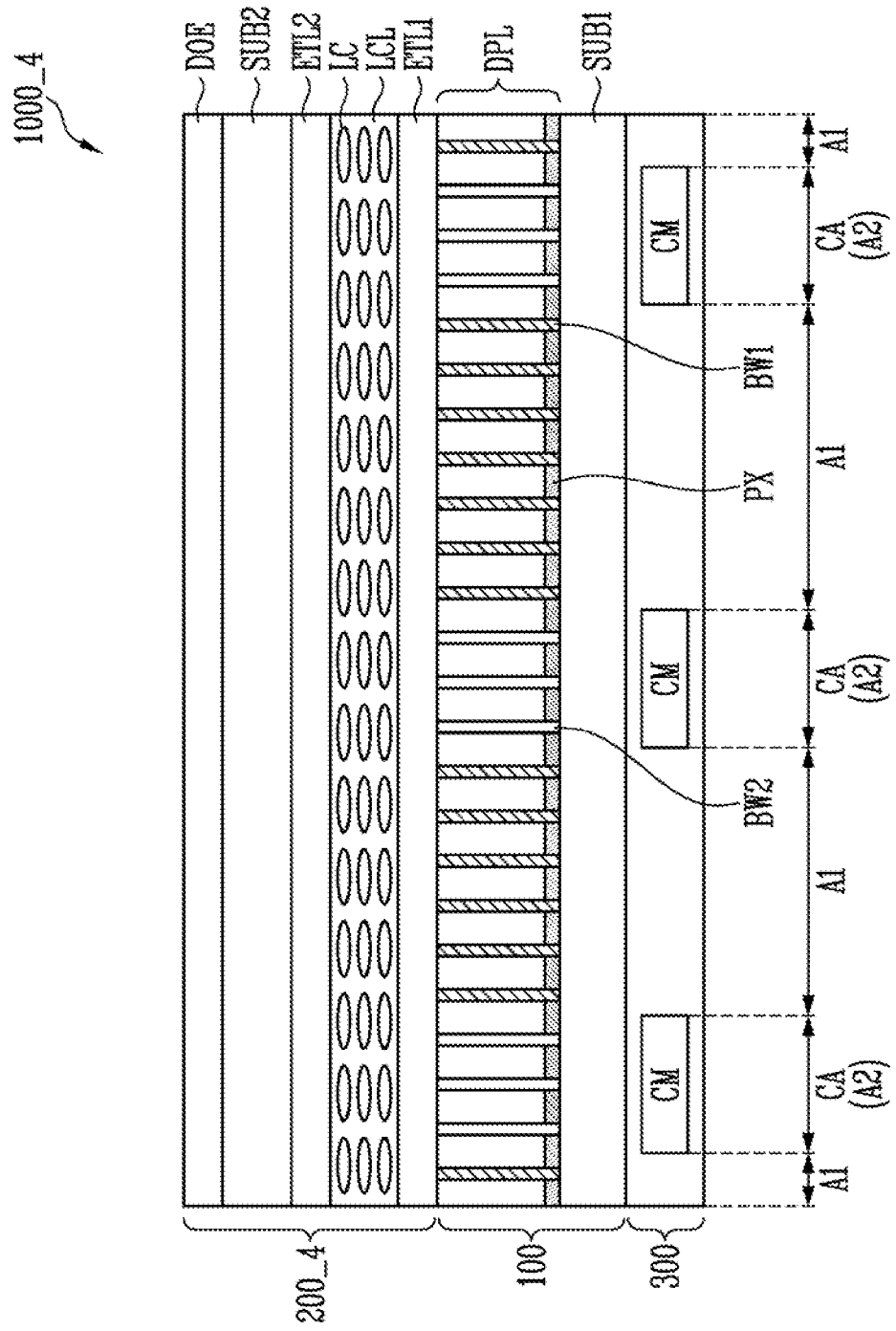
FIG. 10 is a sectional view of a stereoscopic image display device according to an embodiment of the present disclosure.

FIG. 9 is a sectional view of a stereoscopic image display device according to an embodiment of the present disclosure. FIG. 10 is a sectional view of a stereoscopic image display device according to an embodiment of the present disclosure.

FIG. 9 and FIG. 10 illustrate a modification of an embodiment of FIG. 4 with regard to the disposition of a diffraction grating layer DOE.

Descriptions of FIG. 9 and FIG. 10 will focus on differences from embodiments described above i to avoid a repeated description, where the same reference numerals may refer to the same components, and similar reference numerals may refer to similar components.

Referring to FIG. 4, FIG. 9, and FIG. 10, in some embodiments, a diffraction grating layer DOE is disposed on a liquid crystal layer LCL because it plays a role of diffracting (or refracting) light transmitted through the liquid crystal layer LCL.

Accordingly, the diffraction grating layer DOE is disposed between a second electrode layer ETL2 and a second substrate SUB2 of a light modulator 200_3 of a stereoscopic image display device 1000_3 of FIG. 9, or is disposed on the second substrate SUB2 opposite to the second electrode layer ETL2 in a light modulator 200_4 of a stereoscopic image display device 1000_4 of FIG. 10.

Figure 11:
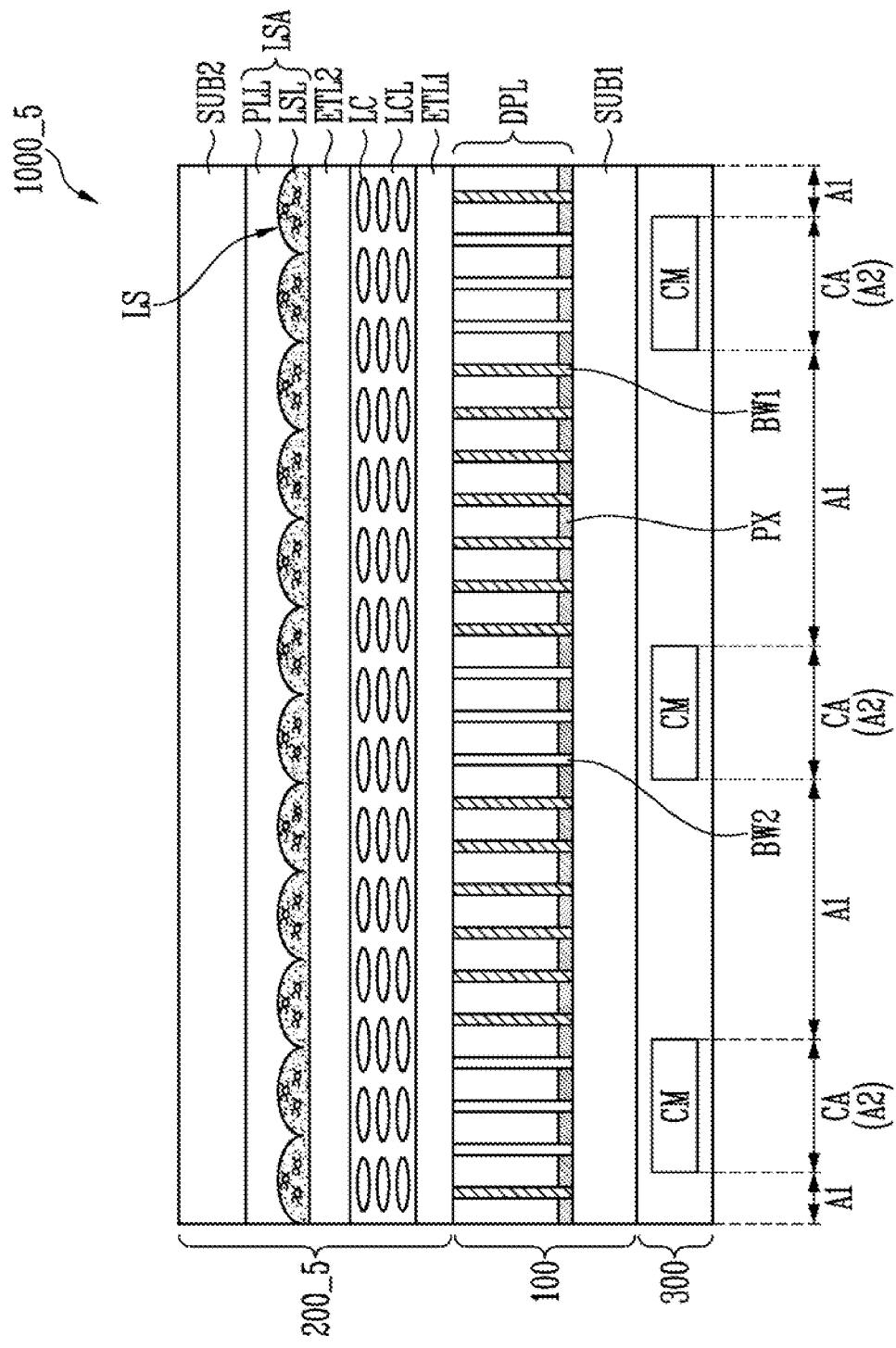
FIG. 11 is a sectional view of a stereoscopic image display device according to an embodiment of the present disclosure.

FIG. 11 is a sectional view of a stereoscopic image display device according to an embodiment of the present disclosure.

FIG. 11 illustrates a modification of an embodiment of FIG. 4 with regard to a light modulator 200_5.

A description of FIG. 11 will focus on differences from embodiments described above to avoid a repeated description, where the same reference numerals may refer to the same components, and similar reference numerals may refer to similar components.

Referring to FIG. 4 and FIG. 11, in an embodiment, the stereoscopic image display device 1000_5 includes a display panel 100 and a light modulator 200_5.

According to an embodiment of FIG. 11, the stereoscopic image display device 1000_5 displays a 3D stereoscopic image by forming a light field by controlling the direction in which light is refracted using a lens array.

The light modulator 200_5 includes a first electrode layer ETL1, a liquid crystal layer LCL, a second electrode layer ETL2, a lens array LSA, and a second substrate SUB2.

The lens array LSA is disposed between the second electrode layer ETL2 and the second substrate SUB2, and includes lenses LS that refract light received from the display panel 100. For example, the lens array LSA may be one of a lenticular lens array or a micro lens array, etc.

The lens array LSA forms a light field by refracting light received from the liquid crystal layer LCL. The lens array LSA includes a lens layer LSL and a planarization layer PLL.

In an embodiment, the lens layer LSL is disposed directly on the second electrode layer ETL2. For example, the material that forms the second electrode layer ETL2 is deposited directly on the lower surface of the lens layer LSL.

In an embodiment, the lens layer LSL includes an array of lenses LS, each having a semicylindrical convex shape. For example, each lens LS is a lenticular lens. However, embodiments are not necessarily limited thereto, and the lenses LS may be micro lenses that has a very small area. When viewed in a plan view, the micro lens may have one of a hexagonal, circular, or elliptical shape.

The size and disposition of the lens LS is determined depending on conditions such as the sizes of pixels PX in the display panel 100, the structure in which the pixels PX are arranged, the size of a pixel area in which the pixels PX are disposed, a viewing distance, resolution, etc.

The lens layer LSL includes an optically anisotropic material. For example, the inside of the lens layer LSL is formed of a reactive mesogen. For example, the lens layer LSL has a mesogenic structure, thereby forming a liquid crystal phase.

The material filling such a lens layer LSL is formed to have a liquid crystal phase by being hardened in response to light, such as ultraviolet light. Accordingly, the inside of the lens layer LSL has a fixed optically anisotropic phase. For example, the lens layer LSL has a major-axis refractive index and a minor-axis refractive index that differ from each other.

The planarization layer PLL is disposed on and covers the lens layer LSL. The planarization layer PLL has a substantially flat top surface, and is formed of an optically isotropic polymer.

For example, the planarization layer PLL includes an optically isotropic material that has a refractive index that is substantially the same as the major-axis refractive index or the minor-axis refractive index of the lens layer LSL.

If light received from the display panel 100 and passing through the liquid crystal layer LCL oscillates along the direction of an axis that has a refractive index different from that of the planarization layer PLL, the light is emitted after being refracted from the surface based on the difference between the refractive index of the lens layer LSL and that of the planarization layer PLL. In this case, a stereoscopic image is displayed by refraction of the emitted light.

If light received from the display panel 100 and passing through the liquid crystal layer LCL oscillates along the direction of an axis having a refractive index that is equal to that of the lens layer LSL and the planarization layer PLL, the incident light is emitted in accord with the oscillation thereof without change.

As described above, a 3D image can be realized depending on the direction in which incident light provided to the lens array LSA oscillates and on the relationship between the refractive index of the lens layer LSL and that of the planarization layer PLL.

In an embodiment, the lens array LSA, which includes the lens layer LSL having a photo-cured reactive mesogen and the planarization layer PLL, and the second substrate SUB2 are provided in the form of films.

In addition, when the lens layer LSL is formed using a fluid liquid crystal polymer, the liquid crystal polymer may flow out of the corresponding lens LS, and an additional substrate or base layer is interposed between the lens layer LSL and the second electrode layer ETL2 to preventing this occurrence. The fluid liquid crystal polymer of the lens layer LSL is aligned depending on the electric field formed in the lens layer LSL. Such a lens array is a liquid-crystal-type lens array. However, a liquid-crystal-type lens array might not be reliable, due to crystallization of the liquid crystal at low temperatures.

In addition, when the stereoscopic image display device has a liquid-crystal-type lens array, the thickness of the lens array LSA increases due to the additional substrates, and a focal distance, which is the distance from a pixel PX to the lens LS, increases.

The focal distance determines optical characteristics of a stereoscopic image, such as a viewing angle, etc., and the viewing angle increases with a decrease in the focal distance, which can improve the quality of a stereoscopic image. In particular, a decrease in a focal distance that results from a decrease in the thickness of the lens array LSA increases the viewing angle.

Because the stereoscopic image display device 1000_5 according to an embodiment of the present disclosure has a structure in which the lens array LSA is disposed directly on the second electrode layer ETL2, an additional substrate between the lens array LSA and the second electrode layer ETL2 is obviated, so that the thickness of the optical structure, such as the light modulator 200_5, on the display panel 100 can be reduced. Accordingly, a viewing angle is increased by decreasing a focal distance for realizing a stereoscopic image, and the quality of the stereoscopic image can be improved.

In addition, an optical bonding process that bonds substrates between the lens array LSA and the second electrode layer ETL2 is omitted, so that the manufacturing process is simplified and manufacturing costs are reduced.

A light modulator of a stereoscopic image display device according to an embodiment of the present disclosure includes a second electrode layer that includes a first sub-electrode that overlaps a first area and a second sub-electrode that overlaps a camera area. A stereoscopic image display device according to an embodiment of the present disclosure separately controls the first sub-electrode and the second sub-electrode, which correspond to upper electrodes, thereby displaying a 3D image while capturing an image of a user's eyes in a mode in which a camera operates. Accordingly, a 3D image that corresponds to information about the positions of the user's eyes and information about the distance therefrom can be provided to a user. As a result, the quality of images provided to the user can be improved.

In addition, a display panel of a stereoscopic image display device according to an embodiment of the present disclosure includes a second lattice member that includes a light-transmissive material between pixels that overlap a camera area. Accordingly, when light reflected from a user's eyes is provided to a camera, light loss is prevent by the lattice member.

In addition, the camera is located on the rear side of the display panel. Accordingly, an overall size of a stereoscopic image display device is reduced, and a size of a bezel thereof is reduced.

However, effects of embodiments of the present disclosure are not limited to the above-mentioned effects, and various other effects may be obtained without departing from the spirit and scope of embodiments of the present disclosure.

Although embodiments of the present disclosure have been described, those skilled in the art will appreciate that embodiments of the present disclosure may be modified and changed in various forms without departing from the spirit and scope of embodiments of the present disclosure as claimed in the accompanying claims.

What is claimed is:

1. A stereoscopic image display device, comprising:
an eye detection sensor that includes a camera that captures an image of a user's eyes;
a display panel disposed on the eye detection sensor and that includes pixels; and
a light modulator disposed on the display panel and that controls a path of light output from the display panel, wherein the light modulator comprises:
a first electrode layer;
a second electrode layer that faces the first electrode layer and includes a first sub-electrode that overlaps a first area of the eye detection sensor and a second sub-electrode that does not overlap the first area but overlaps a second area of the eye detection sensor that overlaps the camera; and
a liquid crystal layer disposed between the first electrode layer and the second electrode layer and that includes liquid crystal molecules,
wherein the display panel further comprises:
a substrate wherein the pixels are disposed and spaced apart from each other on the substrate; and
a first lattice member and a second lattice member, each disposed on the substrate and between the pixels, wherein
the first lattice member overlaps the first area,
the second lattice member overlaps the second area,
the first lattice member includes a light-absorbing material, and
the second lattice member includes a light-transmissive material.

2. The stereoscopic image display device according to claim 1, wherein:
an alignment direction of liquid crystal molecules of the liquid crystal layer that overlap the first area is controlled by a voltage applied to the first sub-electrode, and an alignment direction of liquid crystal molecules of the liquid crystal layer that overlap the second area is controlled by a voltage applied to the second sub-electrode.

3. The stereoscopic image display device according to claim 1, wherein the first electrode layer comprises:
a base layer disposed on the display panel; and
a lower electrode disposed on the base layer.

4. The stereoscopic image display device according to claim 3, wherein the second electrode layer comprises:
a first sub-electrode layer that includes a first sub-base layer, wherein the first sub-electrode is disposed on the first sub-base layer; and
a second sub-electrode layer that includes a second sub-base layer disposed on the first sub-electrode layer, wherein the second sub-electrode is disposed on the second sub-base layer.

5. The stereoscopic image display device according to claim 3, wherein:
the second electrode layer comprises:
a first sub-base layer, wherein
the first sub-electrode is disposed on the first sub-base layer, and
the second sub-electrode is disposed on the first sub-base layer, and
the first sub-electrode and the second sub-electrode are disposed in a same layer.

6. The stereoscopic image display device according to claim 1, wherein:
the first electrode layer comprises:
a base layer disposed on the display panel;
a third sub-electrode disposed on the base layer, wherein the third sub-electrode overlaps the first area; and
a fourth sub-electrode disposed on the base layer, wherein the fourth sub-electrode overlaps the second area, and
the third sub-electrode and the fourth sub-electrode are disposed in a same layer.

7. The stereoscopic image display device according to claim 1, wherein the light modulator further comprises:
a diffraction grating layer disposed on the liquid crystal layer and that diffracts light that is received from the display panel and has passed through the liquid crystal layer.

8. The stereoscopic image display device according to claim 7, wherein the diffraction grating layer is disposed between the liquid crystal layer and the second electrode layer.

9. The stereoscopic image display device according to claim 7, wherein the second electrode layer is disposed between the diffraction grating layer and the liquid crystal layer.

10. The stereoscopic image display device according to claim 1, wherein the light modulator further comprises:
a lens array disposed on the liquid crystal layer and that refracts light that is output from the display panel and that has passed through the liquid crystal layer.

\* \* \* \* \*